United States Patent
Hsu

(10) Patent No.: US 7,291,874 B2
(45) Date of Patent: Nov. 6, 2007

(54) LASER DICING APPARATUS FOR A GALLIUM ARSENIDE WAFER AND METHOD THEREOF

(75) Inventor: Chih-Ming Hsu, Taoyuan (TW)

(73) Assignee: Arima Optoelectronics Corp., Taoyuan (TW)

( * ) Notice: Subject to any disclaimer, the term of this patent is extended or adjusted under 35 U.S.C. 154(b) by 106 days.

(21) Appl. No.: 11/211,450

(22) Filed: Aug. 26, 2005

(65) Prior Publication Data

US 2006/0128121 A1 Jun. 15, 2006

(30) Foreign Application Priority Data

Dec. 14, 2004 (TW) .............................. 93138747 A

(51) Int. Cl.
  H01L 31/072 (2006.01)
  H01L 31/109 (2006.01)
  H01L 31/0328 (2006.01)
  H01L 31/0336 (2006.01)

(52) U.S. Cl. ...................... 257/200; 257/209; 257/631; 257/E21; 257/134; 257/138; 257/172

(58) Field of Classification Search ................ 257/200, 257/201, 209, 614, 615, 620, 631
See application file for complete search history.

(56) References Cited

U.S. PATENT DOCUMENTS

| | | | | |
|---|---|---|---|---|
| 4,888,085 A | * | 12/1989 | Smith | 438/35 |
| 5,198,695 A | * | 3/1993 | Hanes et al. | 257/773 |
| 6,033,484 A | * | 3/2000 | Mahoney | 134/1 |
| 6,472,295 B1 | * | 10/2002 | Morris et al. | 438/463 |
| 6,580,153 B1 | * | 6/2003 | Glenn et al. | 257/620 |

* cited by examiner

*Primary Examiner*—David Nhu
(74) *Attorney, Agent, or Firm*—Rosenberg, Klein & Lee

(57) ABSTRACT

The present invention discloses a laser dicing apparatus for a gallium arsenide wafer and a method thereof, wherein firstly, a gallium arsenide wafer is stuck onto a holding film; next, the gallium arsenide wafer together with the holding film is disposed on a working table; the gallium arsenide wafer has multiple chips or dice with a scribed line drawn between every two chips; a control device and an object lens are used to position the working table and a laser, and two video devices are used to observe whether the laser has been precisely aimed at one of the scribed lines; after parameters have been input into the control device, the laser is used to cut the gallium arsenide wafer, and the gallium arsenide wafer is then separated into multiple discrete chips or dice. The present invention can precisely cut gallium arsenide wafers, reduce the cost and accelerate the fabrication process.

9 Claims, 2 Drawing Sheets

LASER DICING APPARATUS FOR A GALLIUM ARSENIDE WAFER AND METHOD THEREOF

BACKGROUND OF THE INVENTION

1. Field of the Invention

The present invention relates to a dicing apparatus for a gallium arsenide wafer and a method thereof, particularly to a laser dicing apparatus for a gallium arsenide wafer and a method thereof.

2. Description of the Related Art

Gallium arsenide is a group III-V compound semiconductor. Gallium arsenide is a dark-gray solid and has a melting point of 1238° C.; it is stable in the air and not corroded by non-oxidizing acid at the temperature below 600° C. Gallium arsenide has a high electronic mobility, a low dielectric constant and a special energy-band structure, and can be used as a material for epitaxial growth.

As gallium arsenide has superior optoelectronic properties and a higher speed, it is usually used as optoelectronic elements, high-frequency communication elements and microwave communication elements, e.g. used in WLAN (Wireless Local Area Network), WLL(Wireless Local Loop), optical fiber communication, satellite communication, LMDS (Local Multipoint Distribution System), VSAT (Very Small Aperture Terminal), etc. Although a gallium arsenide chip functions better than a silicon chip, it had been only used in some military equipments, satellites or supercomputers because of its high cost, high signal noise ratio, and difficulties in packaging. It is until the emergence of wireless communication market that gallium arsenide was not extensively used. As the radio-frequency elements used for transmitting signals need chips of high working frequency, low energy consumption and low noise, gallium arsenide, which has a high switching speed and a high signal noise ratio, is naturally the best candidate thereof. However, gallium arsenide has higher cost, and its fabrication equipments are different from those used in general silicon processes.

Owing to its special electronic, physical, and optical characteristics, gallium arsenide is used as semiconductors or optoelectronic materials. Gallium arsenide is hard to machine because of its hardness and brittleness. However, cutting a gallium arsenide wafer into discrete chips is an indispensable procedure for a chip fabrication process. High-hardness gallium arsenide wafers must be cut with a high-hardness tool, which raises the cost. Besides, cutting high-hardness gallium arsenide is very time-consuming.

Accordingly, the present invention proposes a laser dicing apparatus for a gallium arsenide wafer and a method thereof in order to overcome the abovementioned problems.

SUMMARY OF THE INVENTION

The primary objective of the present invention is to provide a laser dicing apparatus for a gallium arsenide wafer and a method thereof, wherein a laser is used to precisely cut a gallium arsenide wafer.

Another objective of the present invention is to provide a laser dicing apparatus for a gallium arsenide wafer and a method thereof, wherein a laser is used to cut a gallium arsenide wafer so that the high cost resulting from that the conventional technology uses a high-hardness tool to cut a gallium arsenide wafer can be reduced.

Further objective of the present invention is to provide a laser dicing apparatus for a gallium arsenide wafer and a method thereof, wherein a laser is used to precisely and rapidly cut a gallium arsenide wafer so that the fabrication process can be accelerated.

To achieve the aforementioned objectives, the present invention proposes a laser dicing apparatus for a gallium arsenide wafer, which comprises: a working table, having a vacuum device to fix a gallium arsenide wafer, which has multiple chips or dice with a scribed line drawn between every two chips; a laser, used to cut the gallium arsenide wafer in order to separate the gallium arsenide wafer into multiple discrete chips or dice; a control device, coupled to the working table and the laser, and positioning the working table and the laser to enable the laser to be sequentially aimed at the scribed lines on the gallium arsenide wafer for cutting the gallium arsenide wafer; and a waste gas discharge device, discharging the dust and the waste gas generated during cutting the gallium arsenide wafer.

The present invention also proposes a laser dicing method for a gallium arsenide wafer, which comprises the following steps: firstly, providing a gallium arsenide wafer, which has multiple chips or dice with a scribed line drawn between every two chips; next, disposing the gallium arsenide wafer on a working table; next, positioning the working table and a laser to enable the laser to be precisely aimed at one scribed line to be cut; next, inputting the length of the scribed line to be cut and the spacing between the scribed line to be cut and the scribed line to be cut next; and lastly, sequentially cutting the scribed lines to separate the gallium arsenide wafer into multiple discrete chips or dice.

To enable the objectives, technical contents, characteristics, and accomplishments to be more easily understood, the embodiments of the present invention are to be described below in detail in cooperation with the attached drawings.

DETAILED DESCRIPTION OF THE INVENTION

As gallium arsenide chips become more and more important in semiconductor and optoelectronic industries, the present invention proposes a rapid and precise dicing apparatus for a gallium arsenide wafer and a method thereof in order to efficiently cut a gallium arsenide wafer.

Figure 1:
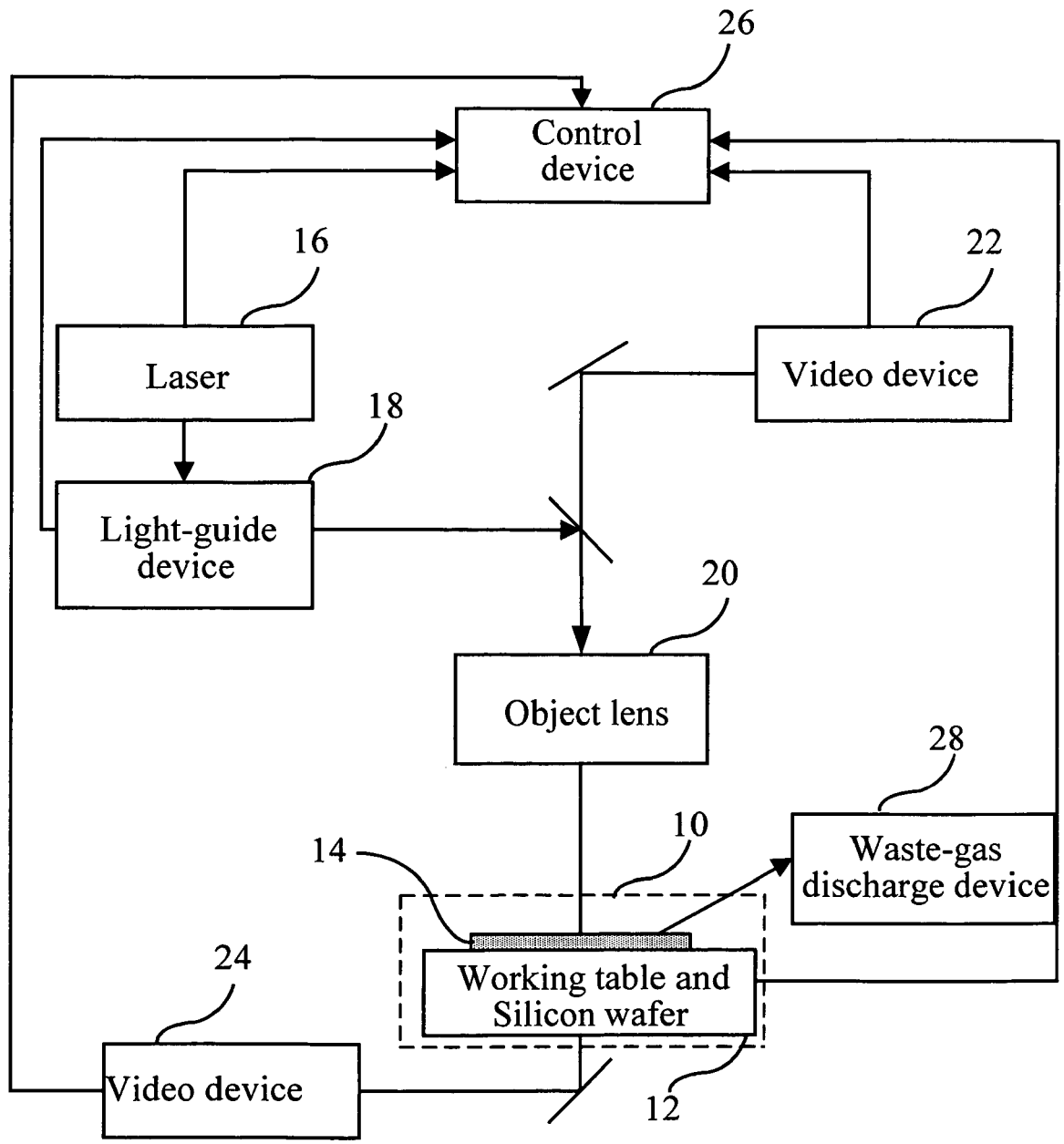
FIG. 1 is a block diagram schematically showing the laser dicing apparatus for a gallium arsenide wafer according to the present invention.

Referring to FIG. 1, the laser dicing apparatus for a gallium arsenide wafer according to the present invention comprises: a working table 12, installed inside a vacuum chamber 10, having a vacuum device (not shown in the drawing) to fixedly suck a gallium arsenide wafer 14, which has multiple chips or dice with a scribed line drawn between every two chips, wherein the gallium arsenide wafer 14 can be previously stuck onto a holding film for its planarity, and then, the gallium arsenide wafer 14 together with the holding film is disposed on the working table 12 (as the gallium arsenide wafer 14 to be cut must be thinned by grinding beforehand, the gallium arsenide wafer 14 may be warped, which will incur a focusing problem of the laser; therefore, a holding film is used to flatten the gallium arsenide wafer 14); a laser 16, used to cut the gallium arsenide wafer 14; a light-guide device 18, used to direct the laser 16 to the gallium arsenide wafer 14; an object lens 20, having focallength-adjust elements, and used to adjust the laser 16 to be aimed at the scribed lines on the gallium arsenide wafer 14; two video devices 22, 24, used to observe whether the laser 16 has be precisely aimed at one of the scribed lines; a control device 26 (such as a computer), controlling all the abovementioned elements, including positioning the working table 12 and the laser 16 to enable the laser 16 to be precisely aimed at one of the scribed lines on the gallium arsenide wafer 14; and a waste gas discharge device 28, further comprising a dust-removing device and a gas-expelling device, and discharging the dust and the waste gas generated during the laser 16's cutting the gallium arsenide wafer 14.

Figure 2:
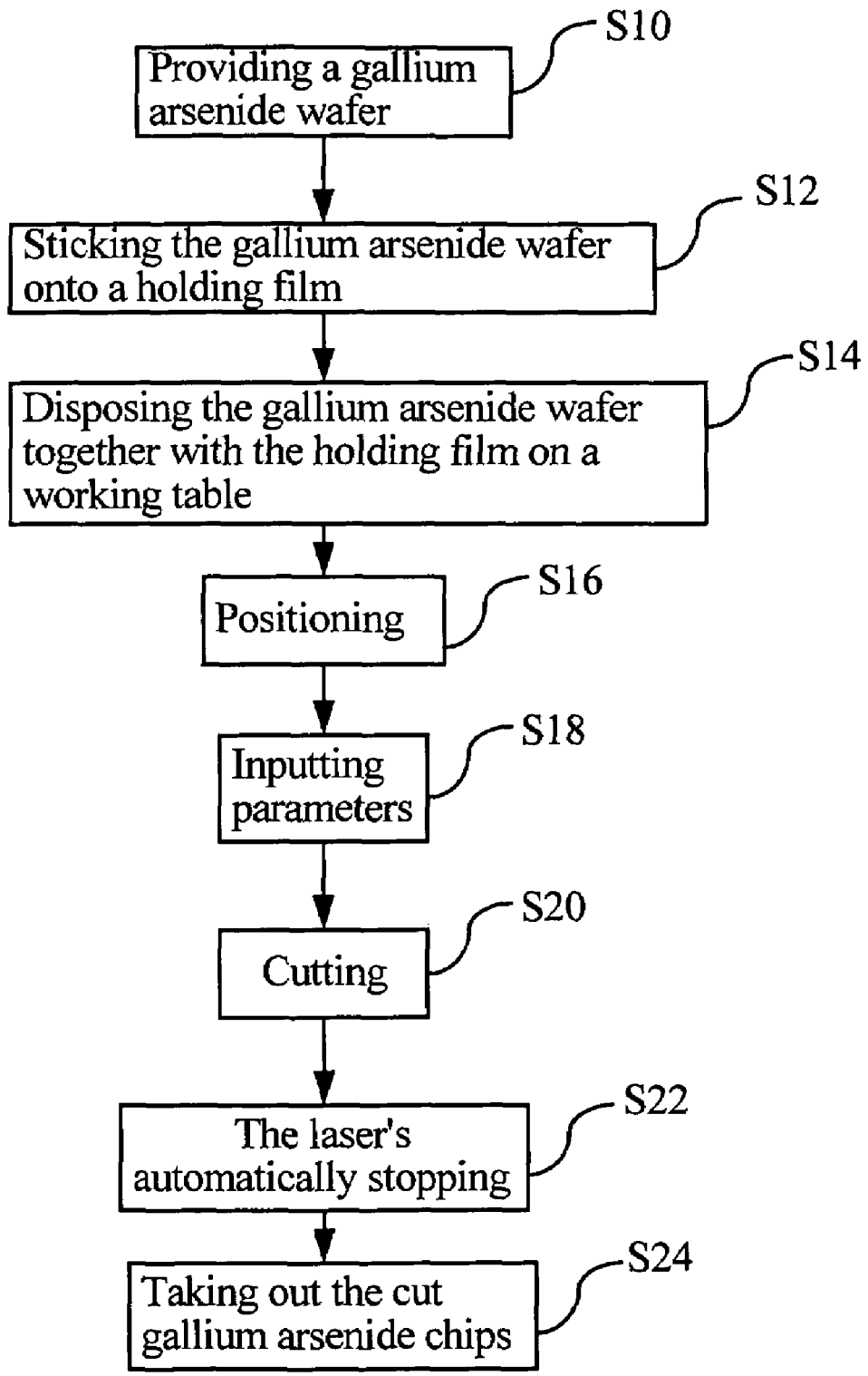
FIG. 2 is a flowchart of the laser dicing method for a gallium arsenide wafer according to the present invention.

Referring to FIG. 2, the present invention further proposes a laser dicing method for a gallium arsenide wafer, which comprises the following steps: firstly, providing a gallium arsenide wafer having multiple chips or dice with a scribed line drawn between every two chips (S10); next, sticking the gallium arsenide wafer onto a holding film in order to flatten the gallium arsenide wafer (S12); next, under a vacuum environment, disposing the gallium arsenide wafer together with the holding film on a working table, which has a vacuum device to fix the gallium arsenide wafer (S14); utilizing a control device to position the laser and the working table, i.e. to adjust their X and Y coordinates, to enable the laser to be precisely aimed at one of the scribed lines, and utilizing an object lens having focal-length-adjust elements to adjust the focal length from the laser to the gallium arsenide wafer, i.e. to adjust its Z coordinate, and utilizing two video devices to observe whether the laser has be precisely aimed at one of the scribed lines (S16); inputting into the control device the length of the scribed line to be cut and the spacing between the scribed line to be cut and another scribed line to be cut next, and also inputting the laser parameters for cutting (S18); the laser's sequentially cutting the scribed lines into a depth larger that one tenth of the thickness of gallium arsenide wafer, and simultaneously utilizing a waste gas discharge device to discharge the dust and the waste gas generated during cutting (S20); after having finished cutting, the laser's automatically stopping (S22); and lastly, shutting the vacuum device of the working table, and taking out the cut gallium arsenide chips or dice (S24).

In the present invention, the thickness of the gallium arsenide wafer ranges from 60 to 500 μm, and the laser parameters for cutting include: a wavelength ranging from 200 to 750 nm, a frequency ranging from 20 to 80 KHz, an energy density ranging from 10 to 250 J/cm$^2$, a duration ranging from 5 to 40 nanosecond, and a beam diameter ranging from 3 to 20 μm so that the gallium arsenide wafer can be perfectly cut and separated into multiple discrete chips or dice.

In summary, the present invention proposes a laser dicing apparatus for a gallium arsenide wafer and a method thereof, wherein the high accuracy characteristics of a laser is used to rapidly and precisely cut gallium arsenide wafers, which not only can reduce the cost resulting from that the conventional technology uses a high-hardness tool to cut a gallium arsenide wafer, but also can accelerate the fabrication process.

Those embodiments described above are to clarify the present invention to enable the persons skilled in the art to understand, make and use the present invention but not intended to limit the scope of the present invention. Any equivalent modification and variation according to the spirit of the present invention disclosed herein is to be included within the scope of the claims stated below.

What is claimed is:

1. A laser dicing apparatus for a gallium arsenide wafer, comprising:
    a working table, having a vacuum device to fix a gallium arsenide wafer, which has multiple chips or dice with a scribed line drawn between every two said chips;
    at least one laser, used to cut said gallium arsenide wafer in order to separate said gallium arsenide wafer into multiple discrete said chips;
    a control device, coupled to said laser and said working table, and positioning said laser and said working table to enable said laser to be sequentially aimed at said scribed lines on said gallium arsenide wafer for cutting said gallium arsenide wafer; and
    a waste gas discharge device operable to discharge dust and waste gas generated during cutting said gallium arsenide wafer.

2. The laser dicing apparatus for a gallium arsenide wafer according to claim 1, wherein said working table is installed inside a vacuum chamber.

3. The laser dicing apparatus for a gallium arsenide wafer according to claim 1, wherein said gallium arsenide wafer is stuck onto a holding film.

4. The laser dicing apparatus for a gallium arsenide wafer according to claim 1, further comprising at least one light-guide device, which is coupled to said laser, said control device and said working table and directs said laser to said gallium arsenide wafer for cutting said gallium arsenide wafer.

5. The laser dicing apparatus for a gallium arsenide wafer according to claim 1, further comprising at least one video device, which is controlled by said control device to observe whether said laser has been precisely aimed at one said scribed line on said gallium arsenide wafer, which is to be cut.

6. The laser dicing apparatus for a gallium arsenide wafer according to claim 5, wherein said video device is disposed above or below said working table.

7. The laser dicing apparatus for a gallium arsenide wafer according to claim 1, further comprising a focal-length-adjust element that is disposed between said laser and said gallium arsenide wafer and used to adjust the focal length by which said laser is to be aimed at said one of said scribed lines.

8. The laser dicing apparatus for a gallium arsenide wafer according to claim 1, wherein said control device is a computer.

9. The laser dicing apparatus for a gallium arsenide wafer according to claim 1, wherein said waste gas discharge device further comprises: a dust-removing device and a gas-expelling device.

* * * * *